United States Patent
Kado et al.

(10) Patent No.: US 11,201,555 B2
(45) Date of Patent: Dec. 14, 2021

(54) SWITCHING POWER SUPPLY DEVICE HAVING SECONDARY SIDE SYNCHRONOUS RECTIFICATION ELEMENT AND CONTROL CIRCUIT THEREFOR

(71) Applicants: Minoru Kado, Hachioji (JP); Takumi Hyugaji, Isehara (JP); Takeshi Sato, Yokohama (JP)

(72) Inventors: Minoru Kado, Hachioji (JP); Takumi Hyugaji, Isehara (JP); Takeshi Sato, Yokohama (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/794,428

(22) Filed: Feb. 19, 2020

(65) Prior Publication Data
US 2020/0280264 A1    Sep. 3, 2020

(30) Foreign Application Priority Data
Mar. 1, 2019  (JP) ............................. JP2019-037480

(51) Int. Cl.
H02M 3/335    (2006.01)
(52) U.S. Cl.
CPC ... H02M 3/33592 (2013.01); H02M 3/33507 (2013.01)
(58) Field of Classification Search
None
See application file for complete search history.

(56) References Cited

U.S. PATENT DOCUMENTS

| | | | |
|---|---|---|---|
| 7,633,780 B2 | 12/2009 | Endo et al. | |
| 9,030,131 B2 | 5/2015 | Kado et al. | |
| 9,331,593 B2 | 5/2016 | Hyugaji et al. | |
| 9,602,010 B2 | 3/2017 | Arima et al. | |
| 10,027,235 B2 | 7/2018 | Choi et al. | |
| 10,536,089 B2 | 1/2020 | Hyugaji et al. | |
| 2015/0023062 A1* | 1/2015 | Hyugaji | H02M 3/33569 363/16 |
| 2015/0103566 A1* | 4/2015 | Keogh | H02M 3/33507 363/21.12 |

FOREIGN PATENT DOCUMENTS

JP    4862432 B2    2/2006

* cited by examiner

*Primary Examiner* — Jeffrey A Gblende
(74) *Attorney, Agent, or Firm* — Holtz, Holtz & Volek PC

(57) ABSTRACT

Disclosed is a switching power supply device including: a transformer for voltage conversion; a main switching element connected in series to a primary coil; a primary side control circuit that performs on/off control of the main switching element; a synchronous rectification MOS transistor connected in series to a secondary coil; and a secondary side control circuit that performs on/off control of the MOS transistor, wherein the secondary side control circuit includes: an off-timing detection circuit that compares a drain voltage of the MOS transistor with a predetermined threshold voltage, and detects a timing to turn off the MOS transistor; and a threshold voltage setting circuit that sets the threshold voltage, and the threshold voltage setting circuit sets the threshold voltage based on a conduction period of the secondary coil or a period obtained by adding the conduction period to a conduction period of the primary coil.

14 Claims, 6 Drawing Sheets

SWITCHING POWER SUPPLY DEVICE HAVING SECONDARY SIDE SYNCHRONOUS RECTIFICATION ELEMENT AND CONTROL CIRCUIT THEREFOR

CROSS-REFERENCE TO RELATED APPLICATION

This application is based upon and claims the benefit of priority from the prior Japanese Patent Application No. 2019-037480, filed on Mar. 1, 2019, the entire contents of which are incorporated herein by reference.

BACKGROUND

Technical Field

The present invention relates to a switching control type DC power supply device including a transformer for voltage conversion, and, for example, relates to a technique effective for use in an insulated DC-DC converter having a synchronous rectification switch on the secondary side of a transformer.

Background Art

Conventionally, as one of switching power supply devices, there has been a switching power supply device (insulated DC-DC converter) that includes a MOS transistor (insulated gate field effect transistor) as a switching element for intermittently applying a current to a primary coil of a transformer and a control circuit (IC) which performs on/off control of the element. The switching power supply device rectifies, with a diode, the current induced in the secondary coil by the current flow through the primary coil, smooths the current with a capacitor, and outputs the result. Such a DC-DC converter is also used in an AC-DC converter in which a DC voltage generated by rectifying an input AC voltage is input to a primary side of a transformer.

In the insulated DC-DC converter using the rectifying diode in the secondary circuit, a loss in the rectifying diode is large, causing a reduction in efficiency. Therefore, as described in JP 4862432 B2 and U.S. Ser. No. 10/027,235 B2, for example, there is a technique of including a switching element for synchronous rectification (MOS transistor) instead of the rectifying diode of the secondary circuit, and a secondary side control circuit to detect the terminal voltage (source-drain voltage) of a secondary switching element and control the turning on of the secondary switching element in synchronization with the off timing of a switching element in the primary circuit, thereby reducing the loss in the rectifying element and improving the efficiency.

In an insulated DC-DC converter of the secondary side synchronous rectification system, the on/off control of secondary synchronous rectification MOS transistor is generally performed by detecting a source-drain voltage of the MOS transistor. However, since the voltage drop due to the on-resistance (usually several mΩ) of the MOS transistor is very small, a highly accurate and stable detection circuit (comparator) with little variation is required to detect the source-drain voltage. The invention of JP 4862432 B2 proposes a means for solving such a problem. Since the source terminal of the synchronous rectification MOS transistor is generally connected to the ground point on the secondary side, in the following description, the source-drain voltage is simply referred to as the drain voltage.

The invention described in JP 4862432 B2 includes: a first timing detection circuit to detect a timing at which forward current flows through a body diode of the synchronous rectification switching element; a second timing detection circuit to detect a variation timing of the on/off control signal for the switching element; and a third timing detection circuit to detect a variation timing with a counter electromotive voltage that is generated at an instant when the body diode is turned off. The on/off control signal for the switching element is generated to turn on the switching element at the first timing, turn off the switching element before the third timing, and bring the off timing of the switching element close to the third timing. The invention described in JP 4862432 B2 includes: a circuit having a function of a timer which is actuated by a detection signal of the second timing detection circuit and outputs a voltage varying at a constant speed; and a comparator to compare a threshold voltage (hereinafter, referred to as a threshold) with the output voltage of the timer circuit, to vary the threshold in accordance with the time difference between the second timing and the third timing.

However, in the above-mentioned insulated DC-DC converter, the threshold of the timer function is adjusted according to the time difference between the second timing and the third timing (the conduction time of the body diode of the synchronous rectification MOS transistor), and thereby the turn-off timing is determined. Thus, for example, when the input or output condition of the power supply device is switched and the conduction period on the primary side and/or the secondary side changes, it takes time for the turn-off timing to reach a stable point by feedback, and thus the adjustment of turn-off timing is delayed, which may cause a reverse current to flow through the switching element and lead to the element destruction (first problem).

On the other hand, the invention described in U.S. Ser. No. 10/027,235 B2 is configured to turn off the synchronous rectifier in response to detecting the drain voltage of the synchronous rectifier (MOS transistor) rising above a turn-off threshold, and to adjust the turn-off threshold based on a detected dead time between the turning off of the synchronous rectifier and the end of conduction through the body diode of the synchronous rectifier. The synchronous rectifier driver that generates the on/off control signal includes a dead time self-tuning block that is configured to have a function of adjusting a current to modulate the on/off control signal based on the detected dead time.

In the power supply device of U.S. Ser. No. 10/027,235 B2 having the above-described configuration, the current gradient after the turning off on the primary side becomes steep in the continuous current mode (CCM) under a heavy load condition. Thus, in order to avoid the backflow, the control from the detection of the off signal by the threshold to the turning off of the synchronous rectification MOS transistor must be completed before the drain current Ids reaches 0 A. However, in general, when the current gradient of the MOS transistor changes in a direction in which the current gradient increases, the drain voltage rises due to the parasitic inductance component, and thus the off-signal detection point based on the turn-off threshold tends to be earlier.

In CCM near the criticality, the time from the change in the gradient of electric current to the time when the current reaches 0 A is very short. Therefore, a high speed response is required for the control from the detection of the off timing based on the threshold to the turning off of the MOS transistor, and a high performance control circuit is required. There is a concern that a backflow may occur and lead to the element destruction, when the following condition (delay time of control circuit)>time until Ids reaches 0 A is satisfied immediately after the shift from DCM to CCM until adjustment to the turn-off threshold of CCM is performed (second problem).

The starting point of the "time until Ids reaches 0 A" in the above inequality is the detection point of the off timing (OFF_SIG signal) based on the turn-off threshold.

Further, the power supply device including the synchronous rectifier of U.S. Ser. No. 10/027,235 B2 operates in a CCM in a state where the cycle of the primary side control IC is fixed. Under this circumstance, the magnitude of the superimposed current changes even by a slight change in the input/output condition of the power supply device, the superimposed current being generated by the addition after turning on of the current by the residual energy due to the synchronous rectifier being turned off before all the accumulated energy of the secondary coil is discharged. Also, the superimposed current may change due to factors such as feedback control for disturbance noise. In the synchronous rectifier disclosed in U.S. Ser. No. 10/027,235 B2, the turn-off threshold is adjusted to a value that advances the turning off compared to the case of DCM by the superimposed current. As a result, the turn-off point deviates from the optimum value even by a slight change in input/output conditions or disturbance noise, which makes the timing of turning off vary back and forth without becoming a fixed cycle, resulting in a reduction in efficiency (third problem).

SUMMARY

The present invention has been made to solve the above-described problems, and an object of the present invention is to avoid the delay of turning off causing a backflow in a synchronous rectification element even when the conduction periods of the primary side and the secondary side change, in a switching power supply device having a transformer for voltage conversion and the synchronous rectification element on the secondary side.

Another object of the present invention is to reduce the response speed required for controlling the synchronous rectifier on the secondary side, and to prevent the occurrence of a dangerous state in which a backflow occurs and the element destruction occurs before adjustment to the turn-off threshold of CCM immediately after the shift from DCM (discontinuous current mode) to CCM (continuous current mode).

Still another object of the present invention is to prevent the turn-off threshold from being excessively corrected in a situation of operating in a CCM (continuous current mode), to avoid the turn-off timing varying back and forth without becoming a fixed cycle, and to prevent the reduction in efficiency.

In order to achieve at least one of the above objects, according to an aspect of the present invention, there is provided a switching power supply device including: a transformer for voltage conversion; a main switching element that is connected in series to a primary coil of the transformer; a primary side control circuit that performs on/off control of the main switching element; a synchronous rectification MOS transistor that is connected in series to a secondary coil of the transformer; and a secondary side control circuit that performs on/off control of the synchronous rectification MOS transistor, wherein the secondary side control circuit includes: an off-timing detection circuit that compares a drain voltage of the synchronous rectification MOS transistor with a predetermined threshold voltage, and detects a timing to turn off the synchronous rectification MOS transistor; and a threshold voltage setting circuit that sets the threshold voltage, and the threshold voltage setting circuit sets the threshold voltage based on a conduction period of the secondary coil or a period obtained by adding the conduction period of the secondary coil to a conduction period of the primary coil.

Preferably, in the switching power supply device, the threshold voltage setting circuit includes: a judgement timing detection circuit that generates a predetermined judgement timing signal at a judgement timing which is set immediately before rise of the drain voltage; a timing judgement circuit that compares the judgement timing signal with an off-timing detection signal which is output from the off-timing detection circuit, and judges a signal at an earlier timing of the judgement timing signal and the off-timing detection signal; and a voltage adjustment circuit that adjusts the threshold voltage to be set according to a judgement result of the timing judgement circuit.

Preferably, in the switching power supply device, the threshold voltage setting circuit adjusts the threshold voltage with the voltage adjustment circuit so that an off timing is advanced, in response to a judgement by the timing judgement circuit that the judgement timing signal is earlier than the off-timing detection signal.

Preferably, in the switching power supply device, the threshold voltage setting circuit adjusts the threshold voltage with the voltage adjustment circuit so that an off timing is delayed, in response to a judgement by the timing judgement circuit that the judgement timing signal is later than the off-timing detection signal.

Preferably, in the switching power supply device, further includes: a first drain detection circuit that compares the drain voltage with a predetermined first voltage and detects a first timing when the drain voltage rises after the synchronous rectification MOS transistor is turned off; a second drain detection circuit that compares the drain voltage with a second voltage lower than the first voltage and detects a second timing when the drain voltage rises; and a mode judgement circuit which judges that an operation mode is a discontinuous current mode in response to exceeding over a predetermined value which is set in advance of a time difference between a detection signal of the first drain detection circuit and a detection signal of the second drain detection circuit, wherein the mode judgement circuit outputs a signal indicating that the operation mode is the discontinuous current mode to the voltage adjustment circuit.

Preferably, in the switching power supply device, the signal indicating that the operation mode is the discontinuous current mode is not input to the voltage adjustment circuit, and the voltage adjustment circuit does not perform an adjustment of the threshold voltage, the adjustment delaying an off timing.

Preferably, in the switching power supply device, the secondary side control circuit turns off the synchronous rectification MOS transistor at the judgement timing in response to a judgement that the judgement timing signal is earlier than the off-timing detection signal.

BRIEF DESCRIPTION OF THE DRAWINGS

The accompanying drawings are not intended as a definition of the limits of the invention but illustrate embodiments of the invention, and together with the general description given above and the detailed description of the embodiments given below, serve to explain the principles of the invention, wherein.

DESCRIPTION OF EMBODIMENTS

Hereinafter, preferred embodiments of the present invention will be described with reference to the drawings.

Figure 1:
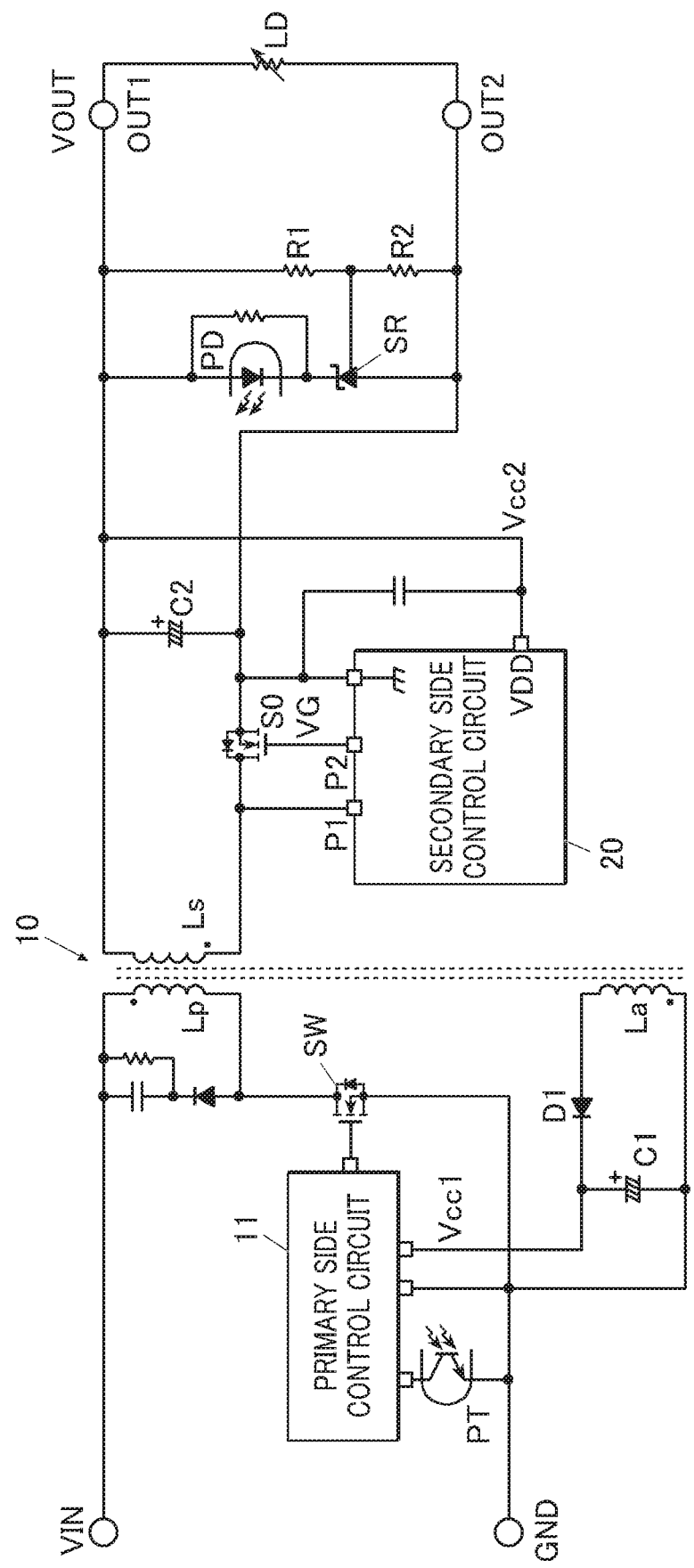
FIG. 1 is a circuit configuration diagram showing a configuration example of a secondary side synchronous rectification type switching power supply device which is effective applying the present invention.

FIG. 1 shows an embodiment of a synchronous rectification type switching power supply device to which the present invention is applied.

The switching power supply device according to this embodiment is configured as an isolated DC-DC converter that includes: a transformer 10 for voltage conversion having a primary coil Lp, a secondary coil Ls, and an auxiliary winding La; a switching element SW including an N-channel MOS transistor and its control circuit (primary side control circuit) 11 on the primary side of the transformer 10; and, on the secondary side, a MOS transistor S0 as a synchronous rectification element and its control circuit (secondary side control circuit) 20. In this embodiment, the transformer 10 has the secondary coil Ls having a polarity opposite to the polarity of the primary coil Lp, and is configured to operate as a flyback converter.

The primary side switching element SW is connected in series with the primary coil Lp of the transformer 10. The primary side control circuit 11 and the secondary side control circuit 20 are each configured as a semiconductor integrated circuit (IC) on a single semiconductor chip or as a semiconductor device mounted in a single package. The secondary side control circuit 20 formed as a semiconductor integrated circuit (IC) and a chip on which the MOS transistor S0 is formed may be mounted in one package as the semiconductor device. A diode D1 and a capacitor C1 are connected in series between the terminals of the auxiliary winding La of the transformer 10, and the voltage induced in the auxiliary winding La is rectified by the diode D1 and smoothed by the capacitor C1, thereby generating the power voltage Vcc1 of the primary side control circuit 11 and supplying the generated power voltage Vcc1 to the power terminal of the primary side control circuit 11.

The DC-DC converter of this embodiment includes a phototransistor PT for receiving light, which is connected to the primary side control circuit 11 and receives a feedback signal from a circuit on the secondary side. The primary side control circuit 11 is configured to change the switching frequency of the switching element SW or the duty ratio in response to a feedback signal, to cope with a change in load and a change in input voltage.

On the other hand, on the secondary side of the transformer 10, there are provided: a MOS transistor S0 for synchronous rectification connected between one terminal of the secondary coil Ls and the output terminal OUT2; a secondary side control circuit 20 that detects the drain voltage of the synchronous rectification MOS transistor S0 with a voltage generated on the secondary side as a power voltage, to generate an on/off control signal for the synchronous rectification MOS transistor S0; and a smooth capacitor C2 that is connected between the output terminals OUT1 and OUT2 to stabilize the output voltage VOUT. The variable resistor LD connected between the output terminals OUT1 and OUT2 represents an example of a load or an equivalently-described load.

The power terminal VDD of the secondary side control circuit 20 is connected to the output terminal OUT1, and the output voltage VOUT is supplied to the secondary side control circuit 20 as the power voltage Vcc2. As for the power voltage of secondary side control circuit 20, the voltage induced in the auxiliary winding of the transformer 10 may be rectified and supplied.

On the secondary side of the transformer 10, a feedback photodiode PD and a shunt regulator SR are connected in series between the output terminals OUT1 and OUT2.

Voltage dividing resistors R1 and R2 are connected between the output terminals OUT1 and OUT2, and a voltage obtained by dividing the output voltage VOUT by the resistance ratio of the resistors R1 and R2 is applied to the shunt regulator SR. Thereby the shunt regulator SR causes a current proportional to the level of the output voltage VOUT to flow through the photodiode PD.

Further, the secondary side photodiode PD and the primary side phototransistor PT are included in a photo-interrupter as an insulation-type signal transmission means, and light emitted from the secondary side photodiode PD is received by the primary side phototransistor PT. A feedback signal corresponding to the light intensity is generated, and the primary side control circuit 11 controls the switching element SW according to the feedback signal.

The secondary side control circuit 20 monitors the voltage of an external terminal (drain voltage detection terminal) P1 connected via a wiring to the drain terminal of the synchronous rectification MOS transistor S0 as a secondary side switching element, and at a predetermined timing, generates a control signal (gate drive voltage) VG for turning on or off the synchronous rectification MOS transistor S0, and outputs the generated control signal to the gate terminal of the synchronous rectification MOS transistor S0 via the external terminal P2.

Figure 2:
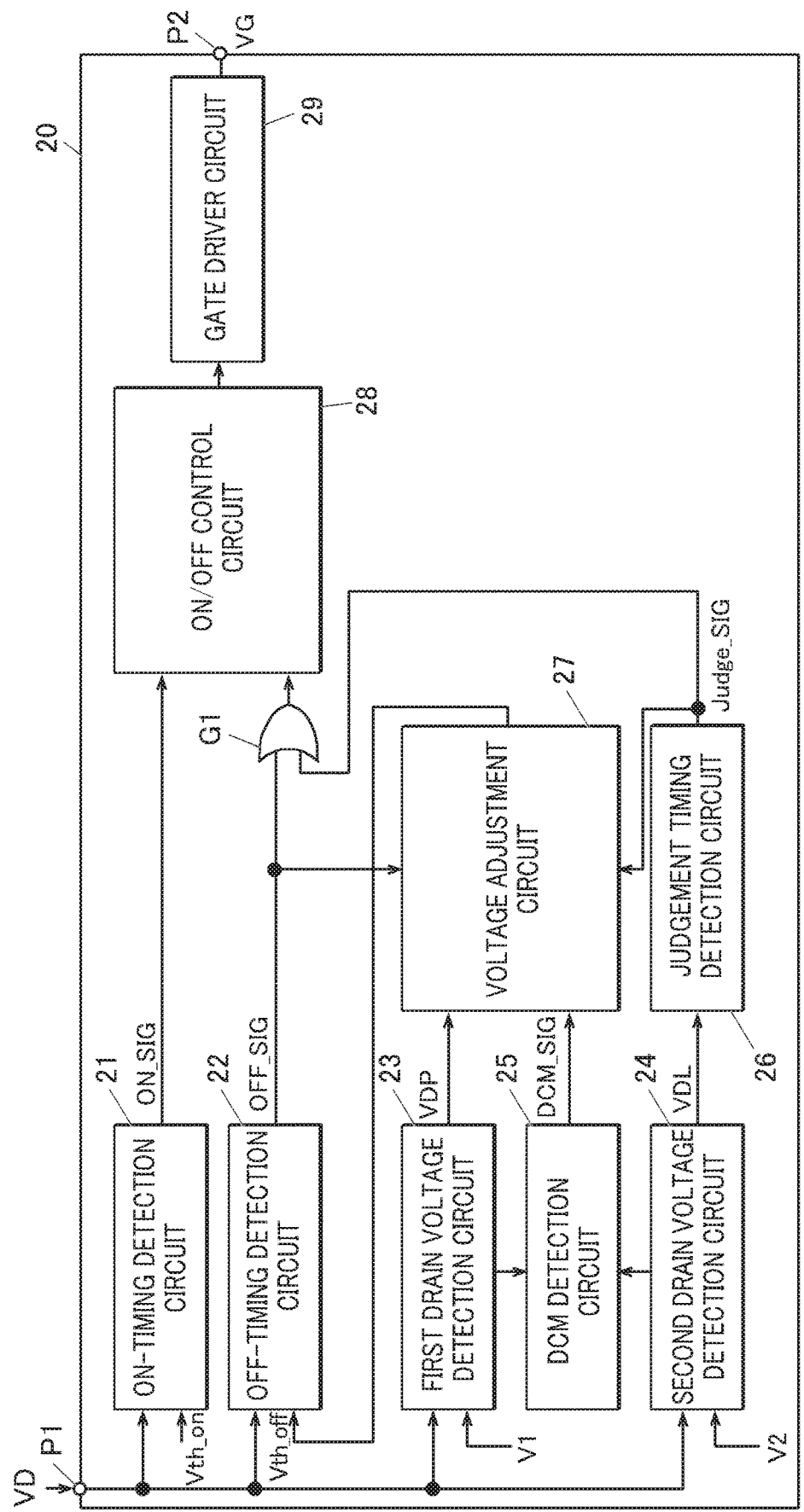
FIG. 2 is a block configuration diagram illustrating a configuration example of a secondary side control circuit included in the switching power supply device in the embodiment.

FIG. 2 shows a configuration example of a main part of the secondary side control circuit 20.

As shown in FIG. 2, the secondary side control circuit 20 includes an on-timing detection circuit 21, an off-timing detection circuit 22, a first drain voltage detection circuit 23, and a second drain voltage detection circuit 24. The on-timing detection circuit 21 includes a comparator comparing the voltage of the drain voltage detection terminal P1 to which the drain terminal of the synchronous rectification MOS transistor S0 is connected with a predetermined threshold voltage Vth_on (for example, −200 mV). The off-timing detection circuit 22 includes a comparator comparing the voltage of the drain voltage detection terminal P1 with a predetermined threshold voltage Vth_off (for example, +30 mV to −150 mV). The first drain voltage detection circuit 23 includes a comparator comparing the voltage of the drain voltage detection terminal P1 with a predetermined threshold voltage V1 (for example, a peak voltage×90%). The second drain voltage detection circuit 24 includes a comparator comparing the voltage of the drain voltage detection terminal P1 with a predetermined threshold voltage V2 (for example, 2V) which is lower than V1.

The threshold Vth_on of the on-timing detection circuit 21 is set to be a voltage that takes into consideration the forward voltage of the body diode so as to reliably detect that a current has started flowing through the body diode of the synchronous rectification MOS transistor S0.

The threshold voltages V1 and V2 for detecting the drain voltage may be any electric potentials as long as V1 and V2 satisfy the relationship of V1>V2, and V2 is higher than the threshold Vth_off.

Further, the secondary side control circuit 20 includes a DCM detection circuit 25, a judgement timing detection circuit 26, and a voltage adjustment circuit 27. The DCM detection circuit 25 detects whether or not the operation mode is DCM (discontinuous current mode) based on the output VDP of the first drain voltage detection circuit 23 and the output VDL of the second drain voltage detection circuit 24. The judgement timing detection circuit 26 determines the timing to be judged regarding the order (regarding which is the earlier) with respect to the off-timing detection signal OFF_SIG based on the output VDL of the second drain voltage detection circuit 24. The voltage adjustment circuit 27 adjusts the threshold voltage Vth of the on-timing detection circuit 21 based on output OFF_SIG of the off-timing detection circuit 22, output VDP of the first drain voltage detection circuit 23, output DCM_SIG of the DCM detection circuit 25 and output Judge_SIG of the judgement timing detection circuit 26.

Further, the secondary side control circuit 20 includes an OR gate G1, an on/off control circuit 28, and a gate driver circuit 29. The OR gate G1 calculates the logical sum of the output OFF_SIG of the off-timing detection circuit 22 and the output Judge_SIG of the judgement timing detection circuit 26. The on/off control circuit 28 generates a signal controlling on/off of the synchronous rectification MOS transistor S0 by being applied to the gate terminal of the synchronous rectification MOS transistor S0 based on an output of the OR gate G1 and the output OFF_SIG of the off-timing detection circuit 22. The gate driver circuit 29 receives the generated on/off control signal, generates a gate drive signal VG and outputs the gate drive signal VG from an external terminal P2.

The on/off control circuit 28 is configured by including an RS flip-flop or the like. When the output signal ON_SIG of the on-timing detection circuit 21 rises, the on/off control circuit 28 changes the gate drive signal VG to a high level to turn on the synchronous rectification MOS transistor S0. When the output signal OFF_SIG of the off-timing detection circuit 22 or the output Judge_SIG of the judgement timing detection circuit 26 rises, the on/off control circuit 28 generates a control signal for changing the gate drive signal VG to a low level to turn off the synchronous rectification MOS transistor S0.

Figure 3:
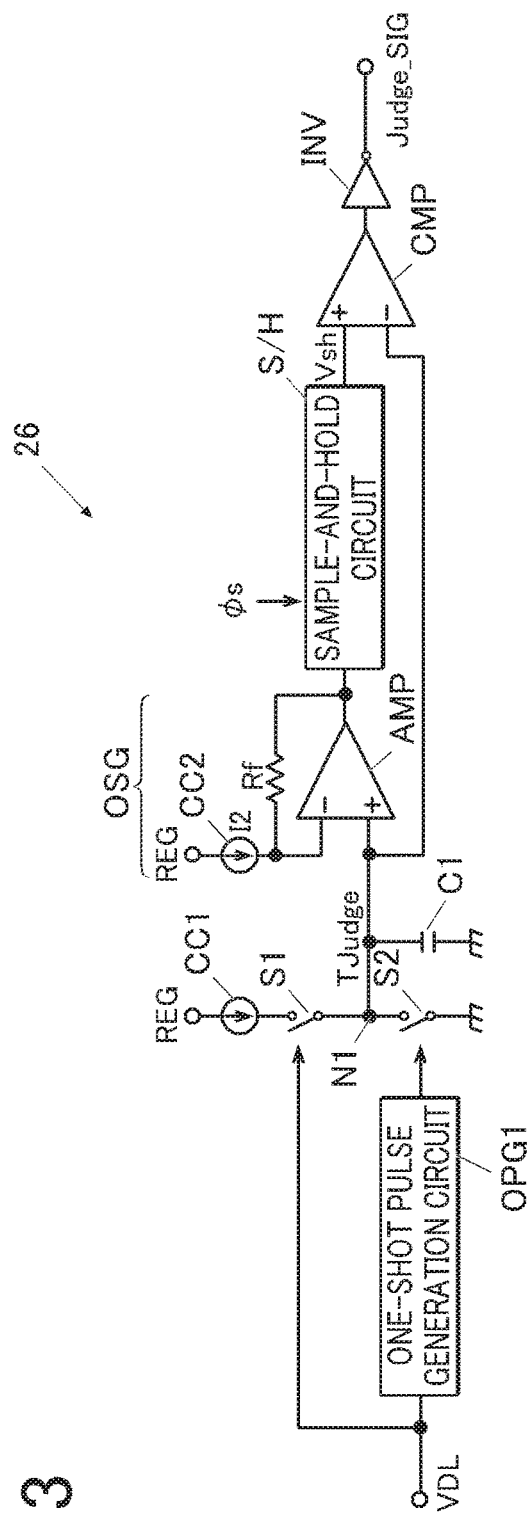
FIG. 3 is a circuit configuration diagram illustrating a specific example of a judgement timing detection circuit included in the secondary side control circuit in the embodiment.
Figure 4:
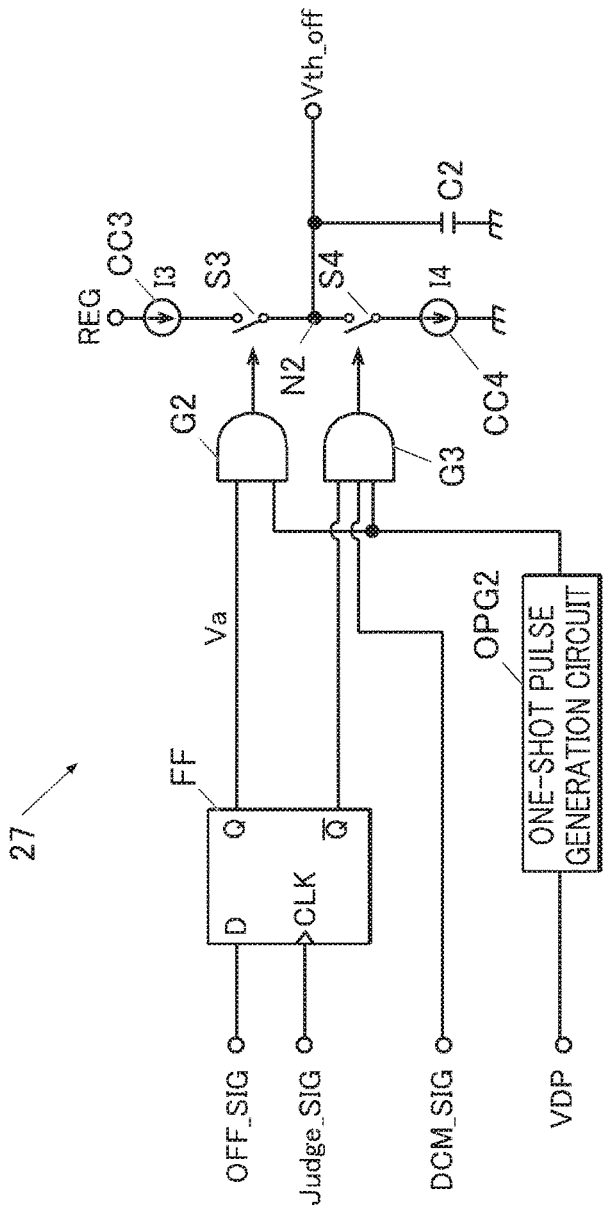
FIG. 4 is a circuit configuration diagram showing a specific example of a threshold voltage adjustment circuit included in the secondary side control circuit in the embodiment.

FIGS. 3 and 4 show specific circuit examples of the judgement timing detection circuit 26 and the voltage adjustment circuit 27 included in the secondary side control circuit 20.

As shown in FIG. 3, the judgement timing detection circuit 26 includes: a constant current source CC1 and on/off switches S1 and S2 connected in series between a power voltage terminal REG and a ground point; and a capacitor C1 that is connected between the connection node N1 of the on/off switches S1 and S2 and the ground point. The switch S1 is turned on and off by the output VDL of the second drain voltage detection circuit 24, and the switch S2 is turned on and off by the output pulse of the one-shot pulse generation circuit OPG1 that generates a pulse in synchronization with the rise of the VDL signal. The capacitor C1 is charged by the current of the constant current source CC1 only while the VDL is at a high level, to function as a timer circuit that outputs a voltage Tjudge corresponding to the pulse width of VDL.

Further, the judgement timing detection circuit 26 includes an offset providing circuit OSG, a sample-and-hold circuit S/H, a comparator CMP, and an inverter INV. The offset providing circuit OSG includes: an operational amplifier AMP in which the charging voltage Tjudge of the capacitor C1 is input to the non-inverting input terminal; a constant current CC2; and a feedback resistor Rf. The offset providing circuit OSG provides an offset for lowering the voltage held when it is desired to subtract a little time from the secondary side conduction period. That is, the offset providing circuit OSG provides an offset for lowering the voltage held so that the judgement timing comes slightly before the end point (fall of VDL) of the secondary side conduction period. The sample-and-hold circuit S/H takes in and holds the voltage to which the offset is provided. The comparator CMP receives the held voltage Vsh of the sample-and-hold circuit S/H and the charging voltage Tjudge of the capacitor C1. The inverter INV inverts the output of the comparator CMP and outputs the inverted output of the comparator CMP as a judgment timing signal Judge_SIG. Although not shown, the timing signal (pulse) cps operating the sample-and-hold circuit S/H can be generated by providing a one-shot pulse generation circuit that detects the fall of the output VDL of the second drain voltage detection circuit 24, for example.

The voltage adjustment circuit 27, as shown in FIG. 4, includes a D-type flip-flop FF, a one-shot pulse generation circuit OPG2, an AND gate G2, and an AND gate G3. The D-type flip-flop FF latches the output OFF_SIG of the off-timing detection circuit 22 with the judgment timing signal Judge_SIG as a trigger signal. The one-shot pulse generation circuit OPG2 generates a pulse in synchronization with the change in the output VDP of the first drain voltage detection circuit 23. The AND gate G2 receives an output Q of the flip-flop FF and a pulse generated by the one-shot pulse generation circuit OPG2. The AND gate G3 receives an inverted output Q of the flip-flop FF, an output DCM_SIG of the DCM detection circuit 25, and an output pulse of the one-shot pulse generation circuit OPG2.

Further, the voltage adjustment circuit 27 includes a constant current source CC3 and on/off switches S3 and S4 and a constant current source CC4 connected in series between the power voltage terminal REG and the ground point, and a capacitor C2 connected between a connection node N2 between the switches S3 and S4 and the ground point. The switch S3 is turned on and off by the output of the AND gate G2, and the switch S4 is turned on and off by the output of the AND gate G3. The capacitor C2 is charged by the current of the constant current source CC3. The capacitor C2 is discharged by the current of the constant current source CC4. Thereby, a voltage corresponding to the difference between the output of the AND gate G2 and the output of the AND gate G3, that is, the on time and the number of times that the turning on is performed, is generated, and the voltage is output as the off-timing threshold Vth_off.

Next, the function and operation of the secondary side control circuit 20 will be described with reference to the waveform diagrams of FIGS. 5 to 6 and FIGS. 7A and 7B. First, generation of the judgement timing signal Judge_SIG by the judgement timing detection circuit 26 shown in FIG. 3 will be described by using FIG. 5.

Figure 5:
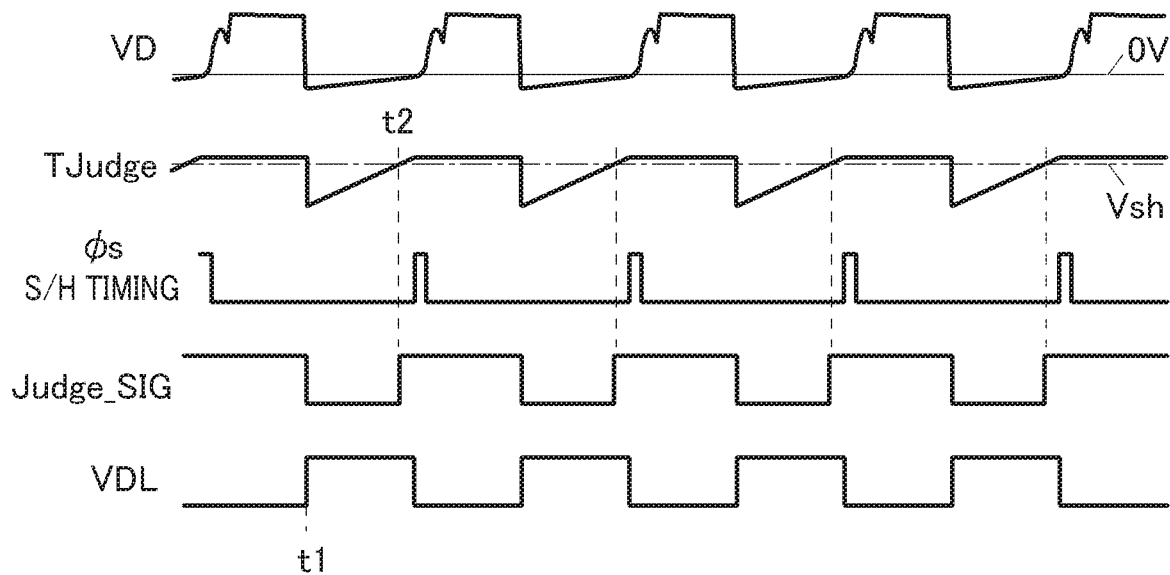
FIG. 5 is a waveform diagram of waveforms showing how a drain voltage of a synchronous rectification element (MOS transistor), a timer output of a timing detection circuit, a sampling pulse, a judgement timing signal, and an output signal of a second drain detection circuit change during operation of the secondary side control circuit in the embodiment.

In FIG. 5, the waveforms show, in order from the top, the changes in the drain voltage VD of the synchronous rectification MOS transistor S0, the charging voltage Tjudge of the capacitor C1, the sampling pulse cps of the sample-and-hold circuit S/H, the judgment timing signal Judge_SIG output from the judgement timing detection circuit 26, and the output VDL of the second drain voltage detection circuit 24. The sampling pulse cps is supplied to the sample-and-hold circuit S/H at the timing when the conduction period of the synchronous rectification MOS transistor S0 ends.

As shown in FIG. 5, the output VDL of the second drain voltage detection circuit 24 (see the waveform of VDL) rises to a high level near the bottom of the fall of the drain voltage VD as shown in the waveform of VD (timing t1). Then, a pulse is output from the one-shot pulse generation circuit OPG1 of the judgement timing detection circuit 26 shown in FIG. 3, the switch S2 is temporarily turned on, the charge of the capacitor C1 is discharged, and the charging voltage Tjudge of the capacitor C1 is reset to 0V. The output of the comparator CMP is inverted, and the judgment timing signal Judge_SIG output from the inverter INV changes to a low level.

Along with the above change to a low level, charging of the capacitor C1 by the current of the constant current source CC1 is started, and the charging voltage Tjudge of the capacitor C1 gradually increases as shown in the waveform of Tjudge in FIG. 5. Then, when Tjudge reaches the holding voltage Vsh of the sample-and-hold circuit S/H (timing t2), the output of the comparator CMP is inverted and the judgment timing signal Judge_SIG output from the inverter INV changes to a high level. Further, a voltage obtained by adding an offset to the charging voltage Tjudge of the capacitor C1 is captured and held in the sample-and-hold circuit S/H by the sampling pulse cps as shown in the waveform of cps S/H TIMING in FIG. 5. By repeating the above operation, the judgement timing signal Judge_SIG that changes as shown in the waveform of Judge_SIG is generated.

Figure 6:
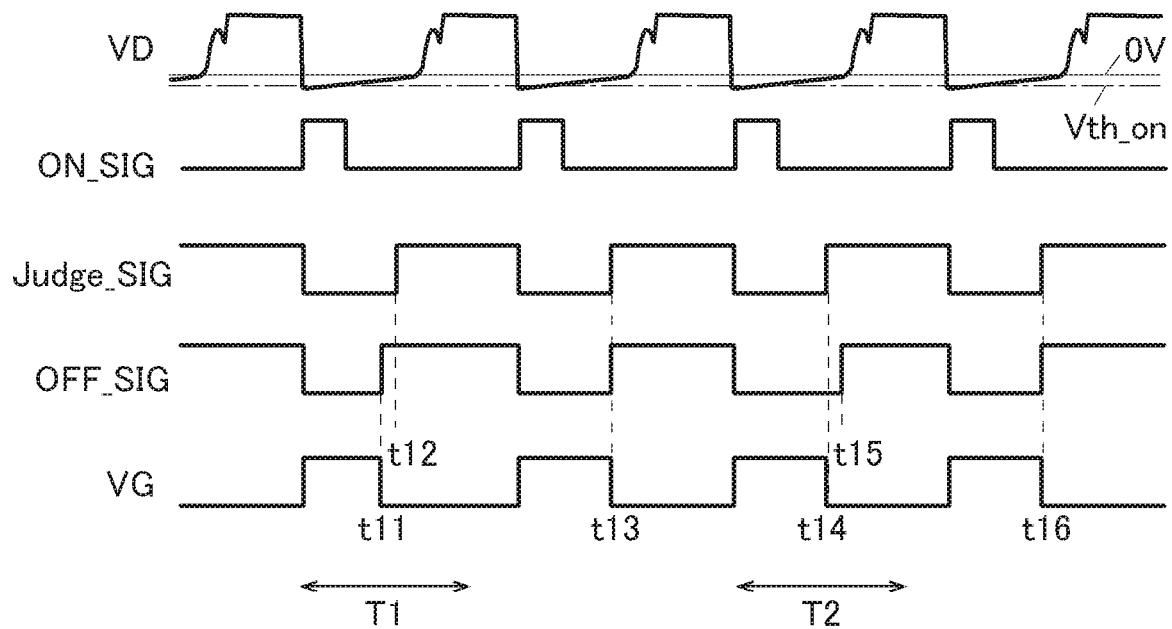
FIG. 6 is a waveform diagram of waveforms showing how the drain voltage of the synchronous rectification element (MOS transistor), the on-timing detection signal, the judgement timing signal, the off-timing detection signal, and the gate drive signal change during the operation of the secondary side control circuit in the embodiment.

FIG. 6 illustrates the relationship between the judgement timing signal Judge_SIG that changes as described above and the output OFF_SIG of the off-timing detection circuit 22. In FIG. 6, the waveforms show, in order from the top, changes in the drain voltage VD of the synchronous rectification MOS transistor S0, the output ON_SIG of the on-timing detection circuit 21, the judgment timing signal Judge_SIG output from the judgment timing detection circuit 26, the output OFF_SIG of the off-timing detection circuit 22, and the gate drive signal VG output from the gate driver circuit 29. In FIG. 6, each of the periods T1 and T2 is a period from the fall of the drain voltage VD to the next fall of the drain voltage VD.

In the timing example shown in FIG. 6, in the period T1, the rising timing t11 of the output OFF_SIG of the off-timing detection circuit 22 is earlier than the rising timing t12 of the judgment timing signal Judge_SIG. In the period T2, the rising timing t14 of the judgment timing signal Judge_SIG is earlier than the rising timing t15 of the output OFF_SIG of the off-timing detection circuit 22.

In the secondary side control circuit 20 of the present embodiment, for example, the output OFF_SIG of the off-timing detection circuit 22 and the judgment timing signal Judge_SIG are input to the on/off control circuit 28 via the OR gate G1. Thereby, the on/off control circuit 28 causes the gate drive signal VG of the synchronous rectification MOS transistor S0 to fall to turn off at the rising timings (t11, t14) each of which is the earlier of the OFF_SIG signal and the Judge_SIG signal.

Further, in the secondary side control circuit 20 of the present embodiment, as shown in FIG. 4, the voltage adjustment circuit 27 latches the OFF_SIG signal in the flip-flop FF at the rise of the Judge_SIG signal, and by the output from the flip-flop FF, turns on the switch S2 for charging the capacitor C2 or the switch S3 for discharging the capacitor C2 for one pulse period.

Figure 7A:
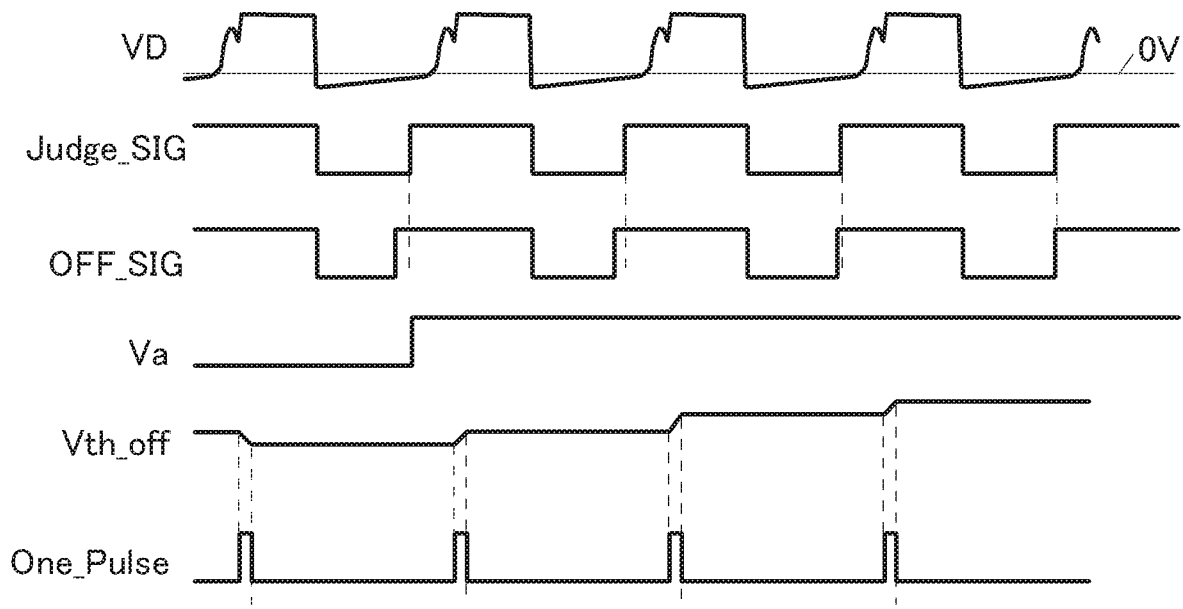
FIG. 7A is a waveform diagram showing how a drain voltage of the synchronous rectification transistor, a judgement timing signal, an off-timing detection signal, a DCM detection signal, a turn-off threshold voltage, and one-shot pulse in a voltage adjustment circuit change during normal operation of the secondary side control circuit in the embodiment, the waveform diagram of FIG. 7A showing waveforms when the off-timing detection signal is earlier than the judgement timing signal.

Therefore, as shown in FIG. 7A, when the rise of the output OFF_SIG of the off-timing detection circuit 22 continues to be earlier than the rise of the judgment timing signal Judge_SIG, the off-timing threshold Vth_off which is the charging voltage of the capacitor C2 is gradually increased step by step, and thereby the rise of the off-timing detection signal OFF_SIG is delayed, to coincide with the rising timing of the judgment timing signal Judge_SIG.

Figure 7B:
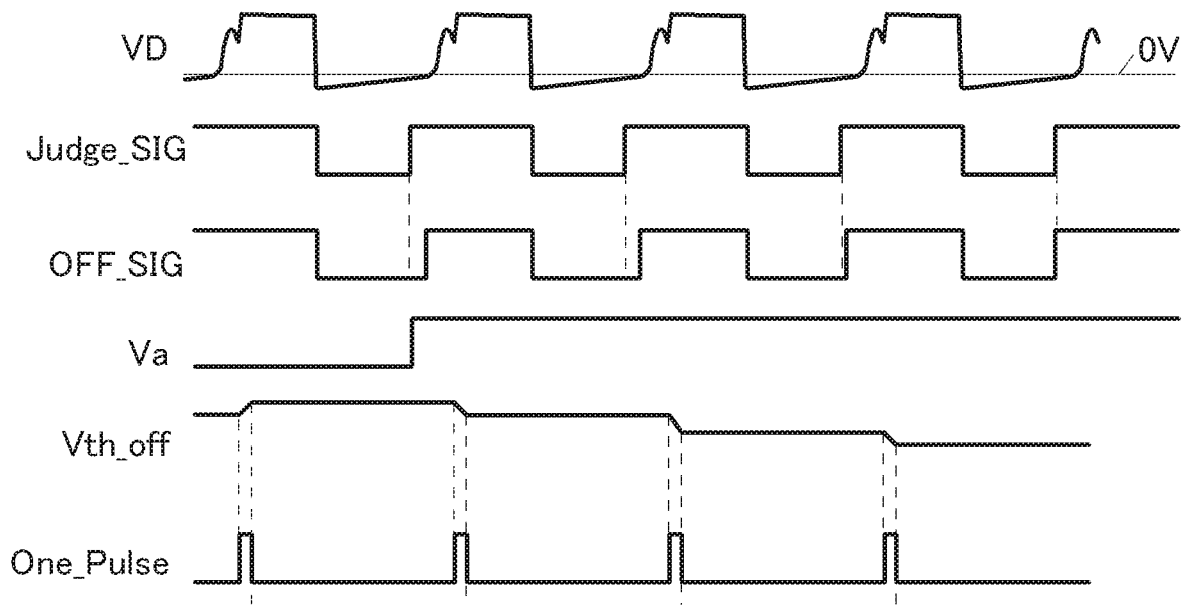
FIG. 7B is a waveform diagram showing how the drain voltage of the synchronous rectification transistor, the judgement timing signal, the off-timing detection signal, the DCM detection signal, the turn-off threshold voltage, and the one-shot pulse in the voltage adjustment circuit change during the normal operation of the secondary side control circuit in the embodiment, the waveform diagram of FIG. 7B showing waveforms when the judgement timing signal is earlier than the off-timing detection signal.

Further, as shown in FIG. 7B, when the rise of the output OFF_SIG of the off-timing detection circuit 22 continues to be later than the judgment timing signal Judge_SIG, the off-timing threshold Vth_off which is the charging voltage of the capacitor C2 is gradually decreased step by step, and thereby the rise of the off-timing detection signal OFF_SIG is advanced, to coincide with the rising timing of the judgment timing signal Judge_SIG.

As can be seen from the above description, in the secondary side control circuit 20 of the present embodiment, the judgement timing is determined based on the conduction period of the secondary side synchronous rectification MOS transistor S0, the order (regarding which is the earlier) of the off-timing detection signal OFF_SIG and the judgement timing signal Judge_SIG is determined, and the threshold for turn-off judgment is adjusted. That is, unlike the invention of JP 4862432 B2, the threshold of the turn-off judgement is not adjusted according to the conduction period of the body diode of the synchronous rectification MOS transistor S0.

Therefore, the above-mentioned first problem can be solved, the first problem being that it takes time for the turn-off timing to reach a stable point by feedback, and the adjustment of the turn-off timing is delayed, thereby a reverse current may flow through the switching element, leading to the element destruction. Further, as described with reference to FIG. 6, when the detection of the turning off by the turn-off threshold, that is, the rise of the off-timing detection signal OFF_SIG is later than the judgement timing signal Judge_SIG, the synchronous rectification MOS transistor S0 is turned off.

As a result, the condition of (delay time of control circuit)>time until Ids reaches 0 A is prevented from being satisfied immediately after the operation mode shifts to CCM until the adjustment to the turn-off threshold is performed. Thus, the response speed required for controlling the secondary side synchronous rectification element can be reduced. Further, it is possible to prevent the backflow from occurring due to the fulfillment of the above conditions and leading to the element destruction (solution of the second problem). The starting point of the "time until Ids reaches 0 A" in the above inequality is the detection point of the off timing (OFF_SIG signal) based on the turn-off threshold.

Figure 8:
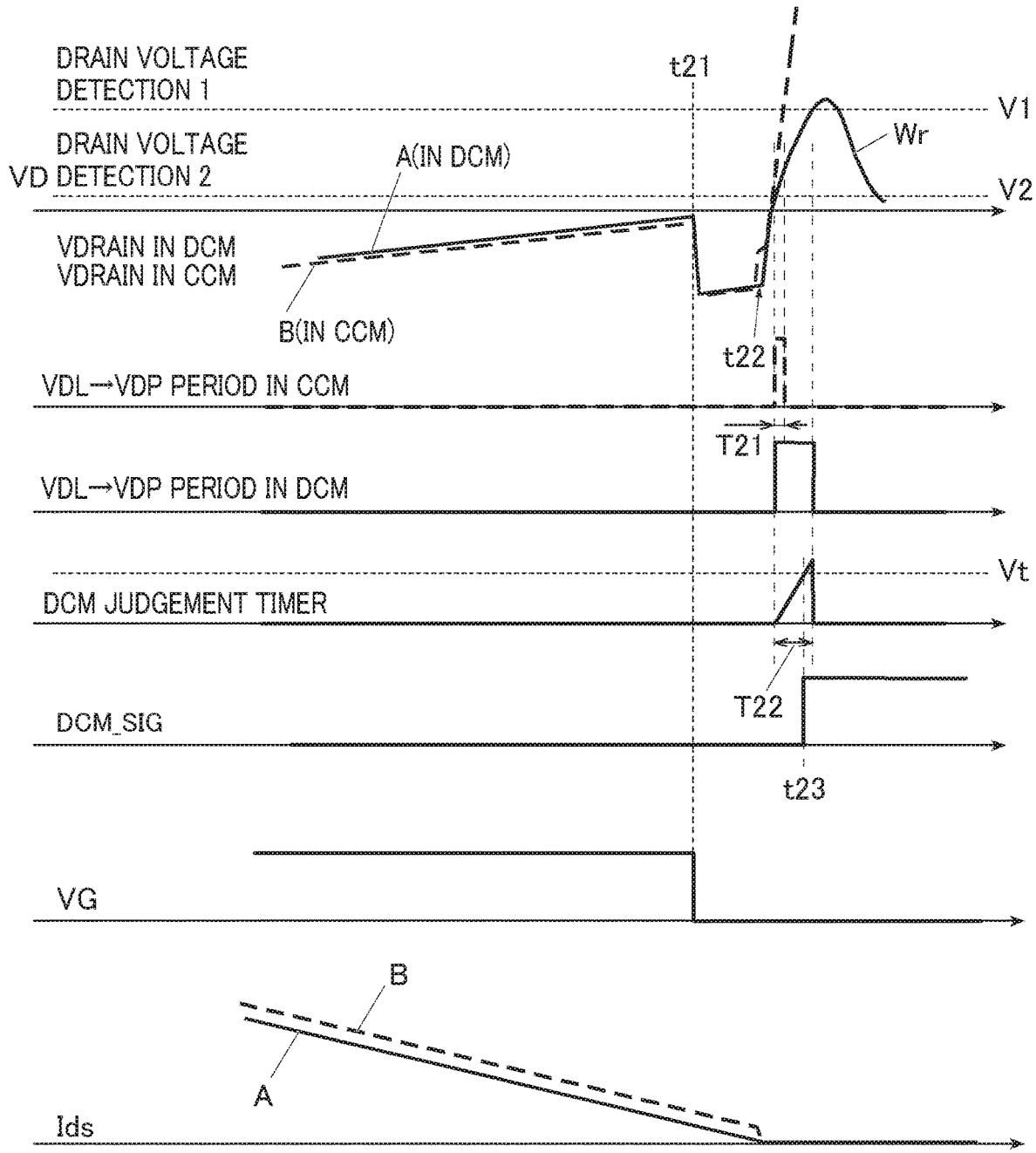
FIG. 8 is a waveform diagram for explaining a DCM detection operation, and is a waveform diagram of enlarged views showing changes in voltages and signals of respective parts during a period before and after a point at which the synchronous rectification MOS transistor switches from on to off.

Next, a DCM detection operation performed in the DCM detection circuit 25 will be described with reference to FIG. 8. FIG. 8 shows enlarged views of the changes in voltages and signals of respective parts in the period before and after a point t21 at which the gate drive signal VG (see the waveform of VG) falls from a high level to a low level, that is, a point at which the synchronous rectification MOS transistor S0 switches from on to off.

In the waveforms of VDRAIN in FIG. 8, the change in the drain voltage VD during DCM (discontinuous current mode) is indicated by a solid line A, and the change in the drain voltage VD during CCM (continuous current mode) is indicated by a broken line B. In the waveforms of Ids in FIG. 8, the change in the drain current Ids of the synchronous rectification MOS transistor S0 during DCM is indicated by a solid line A, and the change of the drain current Ids during CCM is indicated by a broken line B.

As can be seen by comparing the waveforms of the solid line A and the broken line B shown as the waveforms of VDRAIN in FIG. 8, in DCM (discontinuous current mode), the resonance waveform Wr appears after the flowing of drain current Ids has finished, whereas in CCM (continuous current mode), the waveform rises sharply from the timing t22 as indicated by the broken line B. The DCM detection circuit 25 in the secondary side control circuit 20 of the present embodiment detects whether the operation mode is DCM or CCM by utilizing the difference between the waveforms.

Specifically, the waveform of VDL→VDP PERIOD IN CCM in FIG. 8 shows the time T21 from when the drain voltage VD crosses the threshold V2 of the second drain voltage detection circuit 24 to when the drain voltage VD reaches the threshold V1 of the first drain voltage detection circuit 23 in CCM. The waveform of VDL→VDP PERIOD IN DCM in FIG. 8 shows the time T22 from when the drain voltage VD crosses the threshold V2 of the second drain voltage detection circuit 24 to when the drain voltage VD reaches the threshold V1 of the first drain voltage detection circuit 23 in DCM. When T21 shown in the waveform of VDL→VDP PERIOD IN CCM is compared with T22 shown in the waveform of VDL→VDP PERIOD IN DCM, DCM takes the longer time from when the drain voltage VD crosses the threshold V2 of the second drain voltage detection circuit 24 to when the drain voltage VD reaches the threshold V1 of the first drain voltage detection circuit 23.

The DCM detection circuit 25 converts the time width in the waveform of VDL→VDP PERIOD IN DCM into a voltage by a timer circuit (not shown). When the voltage exceeds a predetermined threshold voltage Vt, the DCM detection circuit 25 judges that the operation mode is DCM, and raises the output signal DCM_SIG from a low level to a high level as shown in the waveform of DCM_SIG in FIG. 8.

After this signal DCM_SIG is supplied to the voltage adjustment circuit 27 shown in FIG. 4, when the judgment timing signal Judge_SIG is earlier than the rise of the output OFF_SIG of the off-timing detection circuit 22, the voltage adjustment circuit 27 lowers, by one step, the off-timing threshold Vth_off which is a charging voltage of the capacitor C2. As a result, the next rise of OFF_SIG is shifted forward. When the rise of the output OFF_SIG of the off-timing detection circuit 22 is earlier than the judgement timing signal Judge_SIG, the voltage adjustment circuit 27 raises, by one step, the off-timing threshold Vth_off which is the charging voltage of the capacitor C2. As a result, the next rise of OFF_SIG is shifted backward.

In CCM, the output of the timer circuit of the DCM detection circuit 25 does not exceed the threshold voltage Vt, and the output signal DCM_SIG of the DCM detection circuit 25 does not change to a high level and remains at a low level. This signal DCM_SIG is input only to G3 among the AND gates G2 and G3 included in the voltage adjustment circuit 27 in FIG. 4.

Therefore, when the judgement timing is earlier than the off timing in CCM, the voltage adjustment circuit 27 receiving the signal DCM_SIG does not perform the operation of adjusting the threshold Vth and maintains the previous voltage.

As described above, in CCM, the adjustment function for lowering the off-timing threshold Vth_off to advance the turning off is stopped, and further, when the detection of the off timing (OFF_SIG signal) based on the turn-off threshold (Vth_off) is later than the judgement timing, the synchronous rectification MOS transistor S0 is turned off at the judgement timing. As a result, in CCM, the detection of the off timing based on the judgement timing has a priority over the detection of the off timing (OFF_SIG signal) based on the turn-off threshold (Vth_off). Thus, it is possible to reduce the back-and-forth variation of turning off under the condition of CCM where the superimposed current is large, and to prevent the reduction in efficiency (solution of the third problem).

Although the present invention made by the inventors has been specifically described based on the embodiment, the invention is not limited to the embodiment. For example, the method of determining the judgement timing is not limited to the method based on the secondary side conduction period described in the above embodiment. The judgement timing may be determined based on the sum of a primary side conduction period (a peak period of the drain voltage VD of synchronous rectification MOS transistor S0) and the secondary side conduction period (a bottom period of the drain voltage VD of synchronous rectification MOS transistor S0). Specifically, as an on/off signal of the switch S1 for starting the timer operation of the timer circuit (constant current source CC1 and capacitor C1) of the judgement timing detection circuit 26 in FIG. 3 determining the judgement timing, there may be used a signal that rises in synchronization with the rise of the output signal ON_SIG of the on-timing detection circuit 21 or the rise of the gate drive signal VG, instead of the output VDL of the second drain voltage detection circuit 24. Alternatively, the operation of the timer circuit of the judgement timing detection circuit 26 may be started using the output VDP of the first drain voltage detection circuit 23 as a signal indicating the starting point of the peak period of the drain voltage VD.

Further, in the above-described embodiment, the adjustment of the turn-off threshold (Vth_off) is performed in synchronization with the output VDP of the first drain voltage detection circuit 23. However, instead of VDP, the output VDL of the second drain voltage detection circuit 24 or the output signal ON_SIG of the on-timing detection circuit 21 may be used. Further, the timing of adjusting Vth_off may be a timing which is separately generated to avoid the noise, for the purpose of stability. Further, Vth_off may be adjusted when VDP or the like is detected a plurality of times.

Furthermore, the secondary side synchronous rectification control circuit according to the present invention is not limited to a flyback type switching power supply device (DC-DC converter) as shown in FIG. 1. The present invention is also applicable to other types of DC-DC converters such as a half-bridge DC-DC converter, for example. Further, the present invention can be applied to an LLC resonant converter having a current resonant circuit including a capacitor and an inductor on the primary side.

According to an aspect of the present invention, there is provided a switching power supply device including: a transformer for voltage conversion; a main switching element that is connected in series to a primary coil of the transformer; a primary side control circuit that performs on/off control of the main switching element; a synchronous rectification MOS transistor that is connected in series to a secondary coil of the transformer; and a secondary side control circuit that performs on/off control of the synchronous rectification MOS transistor, wherein the secondary side control circuit includes: an off-timing detection circuit that compares a drain voltage of the synchronous rectification MOS transistor with a predetermined threshold voltage, and detects a timing to turn off the synchronous rectification MOS transistor; and a threshold voltage setting circuit that sets the threshold voltage, and the threshold voltage setting circuit sets the threshold voltage based on a conduction period of the secondary coil or a period obtained by adding the conduction period of the secondary coil to a conduction period of the primary coil.

According to the switching power supply device having the above configuration, instead of adjusting the threshold of the timer function according to the conduction period of the body diode of the synchronous rectification transistor, the threshold of the turn-off judgement is set based on the conduction period of the secondary coil or a period obtained by adding the conduction period of the secondary coil to the conduction period of the primary coil. Thus, even when it takes time for the threshold adjustment to reach a stable point, for example, when the input or output condition of the power supply device is switched and the conduction period of the primary side and/or the secondary side changes, by the drain current Ids approaching 0 A, the drain voltage VD changes according to the VD voltage equation (VD=Ids× (Ron+R)+L×dIds/dt) and exceeds the turn-off threshold, and thereby, the synchronous rectification transistor can be turned off. Thus, it is possible to prevent the flow of reverse current through the synchronous rectification transistor. In the equation of the VD voltage, Ron is the on-resistance of the synchronous rectification transistor, R is the parasitic resistance of the wiring pattern, and L is the parasitic inductance of the wiring pattern.

Preferably, in the switching power supply device, the threshold voltage setting circuit includes: a judgement timing detection circuit that generates a predetermined judgement timing signal at a judgement timing which is set immediately before rise of the drain voltage; a timing judgement circuit that compares the judgement timing signal with an off-timing detection signal which is output from the off-timing detection circuit, and judges a signal at an earlier timing of the judgement timing signal and the off-timing detection signal; and a voltage adjustment circuit that adjusts the threshold voltage to be set according to a judgement result of the timing judgement circuit.

Preferably, in the switching power supply device, the threshold voltage setting circuit adjusts the threshold voltage with the voltage adjustment circuit so that an off timing is advanced, in response to a judgement by the timing judgement circuit that the judgement timing signal is earlier than the off-timing detection signal.

Preferably, in the switching power supply device, the threshold voltage setting circuit adjusts the threshold voltage with the voltage adjustment circuit so that an off timing is delayed, in response to a judgement by the timing judgement circuit that the judgement timing signal is later than the off-timing detection signal.

By the above-described configurations, it is possible to adjust the threshold voltage of the turn-off judgement according to the order (regarding which is the earlier) of the off-timing detection signal and the judgement timing, make the off-timing detection signal approach the judgement timing set slightly before the endpoint of the secondary side conduction period, and reduce the time when a current flows through the body diode immediately after the synchronous rectification transistor is switched from on to off.

Further, the judgement timing can be set before the detection of the off timing based on the threshold, and the response speed required for controlling the secondary side synchronous rectifier can be reduced.

The secondary side control circuit may be configured to turn off the synchronous rectification MOS transistor at the judgement timing in response to a judgment that the judgement timing signal is earlier than the off-timing detection signal.

Preferably, in the switching power supply device, further includes: a first drain detection circuit that compares the drain voltage with a predetermined first voltage and detects a first timing when the drain voltage rises after the synchronous rectification MOS transistor is turned off; a second drain detection circuit that compares the drain voltage with a second voltage lower than the first voltage and detects a second timing when the drain voltage rises; and a mode judgement circuit which judges that an operation mode is a discontinuous current mode in response to exceeding over a predetermined value which is set in advance of a time difference between a detection signal of the first drain detection circuit and a detection signal of the second drain detection circuit, wherein the mode judgement circuit outputs a signal indicating that the operation mode is the discontinuous current mode to the voltage adjustment circuit.

According to such a configuration, the voltage adjustment circuit can execute the adjustment of the turn-off threshold voltage according to whether the operation mode is the continuous current mode or the discontinuous current mode.

Preferably, in the switching power supply device, the signal indicating that the operation mode is the discontinuous current mode is not input to the voltage adjustment circuit, and the voltage adjustment circuit does not perform an adjustment of the threshold voltage, the adjustment delaying an off timing.

According to such a configuration, it is possible to avoid the occurrence of a dangerous state in which a backflow occurs, and leads to the element destruction, until the adjustment to the turn-off threshold of CCM is performed immediately after the shift from DCM to CCM.

Preferably, in the switching power supply device, the secondary side control circuit turns off the synchronous rectification MOS transistor at the judgement timing in response to a judgement that the judgement timing signal is earlier than the off-timing detection signal.

Accordingly, since the detection of the off timing based on the judgement timing is prioritized, it is possible to reduce the back-and-forth variation of turning off under the condition of CCM where the superimposed current is large, and to prevent the reduction of efficiency.

According to an aspect of the present invention, in a switching power supply device provided including a synchronous rectification element on the secondary side, the time required for the current to flow through the body diode immediately after switching the synchronous rectification transistor from on to off under the condition of operating in DCM can be reduced, and in addition, it is possible to prevent the reverse current from flowing through the synchronous rectification transistor. Moreover, until adjustment to the turn-off threshold of CCM is performed immediately after the conduction period of the primary side or the secondary side changes, for example, at the time of shift from DCM (discontinuous current mode) to CCM (continuous current mode), it is possible to avoid the occurrence of a dangerous state in which a backflow occurs and leads to the element destruction, and it is possible to reduce the response speed required for controlling the synchronous rectification element on the secondary side. Further, under the condition of operating in CCM (continuous current mode), the turn-off threshold is prevented from being excessively corrected, the turn-off timing varying back and forth without becoming a fixed cycle is avoided to realize a stable turning off, and the reduction in efficiency can be prevented.

Although some embodiments of the present invention have been described and illustrated in detail, the disclosed embodiments are made for purposes of not limitation but illustration and example only. The scope of the present invention should be interpreted by terms of the appended claims.

What is claimed is:

1. A switching power supply device comprising:
    a transformer for voltage conversion;
    a main switching element that is connected in series to a primary coil of the transformer;
    a primary side control circuit that performs on/off control of the main switching element;
    a synchronous rectification MOS transistor that is connected in series to a secondary coil of the transformer; and
    a secondary side control circuit that performs on/off control of the synchronous rectification MOS transistor,
    wherein:
    the secondary side control circuit includes:
        an off-timing detection circuit that compares a drain voltage of the synchronous rectification MOS transistor with a threshold voltage, and detects a timing to turn off the synchronous rectification MOS transistor; and
        a threshold voltage setting circuit that sets the threshold voltage, and
    the threshold voltage setting circuit includes:
        a judgement timing detection circuit that generates a predetermined judgement timing signal at a judgement timing which is set immediately before rise of the drain voltage;
        a timing judgement circuit that compares the judgement timing signal with an off-timing detection signal which is output from the off-timing detection circuit, and determines which one of the judgement timing signal and the off-timing detection signal is earlier; and
        a voltage adjustment circuit that sets the threshold voltage according to the determination of which one of the judgement timing signal and the off-timing detection signal is earlier.

2. The switching power supply device according to claim 1, wherein the threshold voltage setting circuit sets the threshold voltage with the voltage adjustment circuit so that an off timing is advanced, in response to a determination by the timing judgement circuit that the judgement timing signal is earlier than the off-timing detection signal.

3. The switching power supply device according to claim 1, wherein the threshold voltage setting circuit sets the threshold voltage with the voltage adjustment circuit so that an off timing is delayed, in response to a determination by the timing judgement circuit that the judgement timing signal is later than the off-timing detection signal.

4. The switching power supply device according to claim 1, further comprising:
    a first drain detection circuit that compares the drain voltage with a predetermined first voltage and detects a first timing when the drain voltage rises after the synchronous rectification MOS transistor is turned off;
    a second drain detection circuit that compares the drain voltage with a second voltage lower than the first voltage and detects a second timing when the drain voltage rises; and
    a mode judgement circuit which judges that an operation mode is a discontinuous current mode in response to a determination that a time difference between a detection signal of the first drain detection circuit and a detection signal of the second drain detection circuit exceeds a predetermined value which is set in advance,
    wherein the mode judgement circuit outputs a signal indicating that the operation mode is the discontinuous current mode to the voltage adjustment circuit.

5. The switching power supply device according to claim 4, wherein when the signal indicating that the operation mode is the discontinuous current mode is not input to the voltage adjustment circuit, the voltage adjustment circuit does not perform an adjustment delaying an off timing of the threshold voltage.

6. The switching power supply device according to claim 1, wherein the secondary side control circuit turns off the synchronous rectification MOS transistor at the judgement timing in response to a determination by the timing judgement circuit that the judgement timing signal is earlier than the off-timing detection signal.

7. A switching power supply device comprising:
    a transformer for voltage conversion;

a main switching element that is connected in series to a primary coil of the transformer;

a primary side control circuit that performs on/off control of the main switching element;

a synchronous rectification MOS transistor that is connected in series to a secondary coil of the transformer; and a secondary side control circuit that performs on/off control of the synchronous rectification MOS transistor, wherein:

the secondary side control circuit includes:

an off-timing detection circuit that compares a drain voltage of the synchronous rectification MOS transistor with a threshold voltage, and detects a timing to turn off the synchronous rectification MOS transistor; and a threshold voltage setting circuit that sets the threshold voltage, and the threshold voltage setting circuit sets the threshold voltage based on a period obtained by adding the conduction period of the secondary coil to a conduction period of the primary coil.

8. The switching power supply device according to claim 7, wherein the threshold voltage setting circuit includes:

a judgement timing detection circuit that generates a predetermined judgement timing signal at a judgement timing which is set immediately before rise of the drain voltage;

a timing judgement circuit that compares the judgement timing signal with an off-timing detection signal which is output from the off-timing detection circuit, and determines which one of the judgement timing signal and the off-timing detection signal is earlier; and a voltage adjustment circuit that sets the threshold voltage according to the determination of which one of the judgement timing signal and the off-timing detection signal is earlier.

9. The switching power supply device according to claim 8, wherein the threshold voltage setting circuit sets the threshold voltage with the voltage adjustment circuit so that an off timing is advanced, in response to a determination by the timing judgement circuit that the judgement timing signal is earlier than the off-timing detection signal.

10. The switching power supply device according to claim 8, wherein the threshold voltage setting circuit sets the threshold voltage with the voltage adjustment circuit so that an off timing is delayed, in response to a determination by the timing judgement circuit that the judgement timing signal is later than the off-timing detection signal.

11. The switching power supply device according to claim 8, further comprising:

a first drain detection circuit that compares the drain voltage with a predetermined first voltage and detects a first timing when the drain voltage rises after the synchronous rectification MOS transistor is turned off;

a second drain detection circuit that compares the drain voltage with a second voltage lower than the first voltage and detects a second timing when the drain voltage rises; and a mode judgement circuit which judges that an operation mode is a discontinuous current mode in response to a determination that a time difference between a detection signal of the first drain detection circuit and a detection signal of the second drain detection circuit exceeds a predetermined value which is set in advance, wherein the mode judgement circuit outputs a signal indicating that the operation mode is the discontinuous current mode to the voltage adjustment circuit.

12. The switching power supply device according to claim 11, wherein when the signal indicating that the operation mode is the discontinuous current mode is not input to the voltage adjustment circuit, the voltage adjustment circuit does not perform an adjustment delaying an off timing of the threshold voltage.

13. The switching power supply device according to claim 8, wherein the secondary side control circuit turns off the synchronous rectification MOS transistor at the judgement timing in response to a determination by the timing judgement circuit that the judgement timing signal is earlier than the off-timing detection signal.

14. A switching power supply device comprising:

a transformer for voltage conversion;

a main switching element that is connected in series to a primary coil of the transformer;

a primary side control circuit that performs on/off control of the main switching element;

a synchronous rectification MOS transistor that is connected in series to a secondary coil of the transformer; and a secondary side control circuit that performs on/off control of the synchronous rectification MOS transistor, wherein:

the secondary side control circuit includes:

an off-timing detection circuit that compares a drain voltage of the synchronous rectification MOS transistor with a threshold voltage, and detects a timing to turn off the synchronous rectification MOS transistor; and a threshold voltage setting circuit that sets the threshold voltage, the threshold voltage setting circuit includes:

a judgement timing detection circuit that generates a predetermined judgement timing signal based on a conduction period of the secondary coil; and a timing judgement circuit that compares the judgement timing signal with an off-timing detection signal which is output from the off-timing detection circuit, and determines which one of the judgement timing signal and the off-timing detection signal is earlier, and the threshold voltage setting circuit sets the threshold voltage according to the determination of which one of the judgement timing signal and the off-timing detection signal is earlier.

* * * * *